US008706493B2

(12) United States Patent
Lin et al.

(10) Patent No.: US 8,706,493 B2
(45) Date of Patent: Apr. 22, 2014

(54) CONTROLLABLE PROSODY RE-ESTIMATION SYSTEM AND METHOD AND COMPUTER PROGRAM PRODUCT THEREOF

(75) Inventors: Cheng-Yuan Lin, Tainan (TW); Chien-Hung Huang, Tainan (TW); Chih-Chung Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 211 days.

(21) Appl. No.: 13/179,671

(22) Filed: Jul. 11, 2011

(65) Prior Publication Data

US 2012/0166198 A1 Jun. 28, 2012

(30) Foreign Application Priority Data

Dec. 22, 2010 (TW) ............................... 99145318 A

(51) Int. Cl.

*G10L 13/00* (2006.01)
*G10L 21/00* (2013.01)
*G10L 15/00* (2013.01)

(52) U.S. Cl.

USPC ........... 704/260; 704/265; 704/267; 704/268; 704/263; 704/275; 704/226; 704/200; 704/258; 704/246

(58) Field of Classification Search

USPC ......... 704/260, 265, 267, 268, 263, 275, 246, 704/258, 200, 226
See application file for complete search history.

(56) References Cited

U.S. PATENT DOCUMENTS

| | | | | |
|---|---|---|---|---|
| 6,101,470 | A | 8/2000 | Eide et al. | |
| 6,260,016 | B1 * | 7/2001 | Holm et al. | 704/260 |
| 6,477,495 | B1 * | 11/2002 | Nukaga et al. | 704/268 |
| 6,546,367 | B2 * | 4/2003 | Otsuka | 704/260 |
| 6,847,931 | B2 * | 1/2005 | Addison et al. | 704/260 |
| 6,856,958 | B2 | 2/2005 | Kochanski et al. | |
| 6,961,704 | B1 * | 11/2005 | Phillips et al. | 704/268 |
| 7,062,440 | B2 | 6/2006 | Brittan et al. | |
| 7,136,816 | B1 | 11/2006 | Strom | |
| 7,165,030 | B2 * | 1/2007 | Yi et al. | 704/238 |

(Continued)

FOREIGN PATENT DOCUMENTS

| | | | |
|---|---|---|---|
| CN | 1259631 | A | 7/2000 |
| CN | 1825430 | | 8/2006 |

(Continued)

OTHER PUBLICATIONS

T. Yoshimura et al., "Simultaneous modeling of spectrum, pitch and duration in HMM-based speech synthesis," Proc. of Eurospeech, pp. 2347-2350, 1999.

(Continued)

*Primary Examiner* — Pierre-Louis Desir
*Assistant Examiner* — Neeraj Sharma
(74) *Attorney, Agent, or Firm* — Rabin & Berdo, P.C.

(57) ABSTRACT

In one embodiment of a controllable prosody re-estimation system, a TTS/STS engine consists of a prosody prediction/estimation module, a prosody re-estimation module and a speech synthesis module. The prosody prediction/estimation module generates predicted or estimated prosody information. And then the prosody re-estimation module re-estimates the predicted or estimated prosody information and produces new prosody information, according to a set of controllable parameters provided by a controllable prosody parameter interface. The new prosody information is provided to the speech synthesis module to produce a synthesized speech.

25 Claims, 15 Drawing Sheets

(56) References Cited

U.S. PATENT DOCUMENTS

| | | | | |
|---|---|---|---|---|
| 7,200,558 | B2 | 4/2007 | Kato et al. | |
| 7,240,005 | B2 | 7/2007 | Chihara | |
| 7,472,065 | B2 * | 12/2008 | Aaron et al. | 704/258 |
| 7,739,113 | B2 | 6/2010 | Kaneyasu | |
| 7,761,301 | B2 * | 7/2010 | Xu | 704/260 |
| 7,765,101 | B2 * | 7/2010 | En-Najjary et al. | 704/246 |
| 8,010,362 | B2 * | 8/2011 | Tamura et al. | 704/265 |
| 8,140,326 | B2 * | 3/2012 | Chen et al. | 704/226 |
| 8,244,534 | B2 * | 8/2012 | Qian et al. | 704/256.3 |
| 8,321,225 | B1 * | 11/2012 | Jansche et al. | 704/263 |
| 8,494,856 | B2 * | 7/2013 | Latorre et al. | 704/260 |
| 2001/0037195 | A1 * | 11/2001 | Acero et al. | 704/200 |
| 2003/0004723 | A1 * | 1/2003 | Chihara | 704/260 |
| 2004/0172255 | A1 * | 9/2004 | Aoki et al. | 704/275 |
| 2005/0119890 | A1 | 6/2005 | Hirose | |
| 2006/0122834 | A1 * | 6/2006 | Bennett | 704/256 |
| 2007/0094030 | A1 | 4/2007 | Xu | |
| 2007/0260461 | A1 * | 11/2007 | Marple et al. | 704/260 |
| 2009/0055188 | A1 * | 2/2009 | Hirabayashi et al. | 704/260 |
| 2009/0234652 | A1 * | 9/2009 | Kato et al. | 704/260 |
| 2013/0262120 | A1 * | 10/2013 | Hirose et al. | 704/260 |

FOREIGN PATENT DOCUMENTS

| | | |
|---|---|---|
| CN | 101452699 A | 6/2009 |
| TW | 275122 | 5/1996 |
| TW | 200620239 | 6/2006 |
| TW | 200935399 | 8/2009 |

OTHER PUBLICATIONS

T. Toda et al., "A Speech Parameter Generation Algorithm Considering Global Variance for HMM-Based Speech Synthesis," IEICE—Transactions on Information and Systems, pp. 816-824, 2007.

M. Schröder et al., "The German Text-to-Speech Synthesis System MARY: A Tool for Research, Development and Teaching," International Journal of Speech Technology, vol. 6, No. 4, pp. 365-377, 2003.

A. Dirksen et al., "Prosody Control in Fluent Dutch Text-to-Speech," in Third ESCA/COCOSDA Workshop on Speech Synthesis, pp. 111-114, 1998.

C. Shih et al., "Prosody Control for Speaking and Singing Styles," in Proceedings of Eurospeech, pp. 669-672, 2001.

China Patent Office, Office Action, Patent Application Serial No. CN201110039235.8, Dec. 25, 2012, China.

* cited by examiner

CONTROLLABLE PROSODY RE-ESTIMATION SYSTEM AND METHOD AND COMPUTER PROGRAM PRODUCT THEREOF

TECHNICAL FIELD

The disclosure generally relates to a controllable prosody re-estimation system and method, and computer program product thereof.

BACKGROUND

Prosody prediction in text-to-speech (TTS) system has a great influence on the naturalness of the synthesized speech. The current TTS systems adopt either corpus-based (optimal unit selection) approach or HMM-based statistics one. In general, HMM-based approach can achieve more consistent results as compared with corpus-based one. Moreover, the trained speech models by using HMM are usually small in size, e.g. 3 MB. With these advantages over the corpus-based approach, the HMM-based approach has recently become popular. Nevertheless, this approach suffers from an over-smoothing problem on the generation of prosody. Some documents disclosed a global variance method to ameliorate the problem. They indeed obtained positive results; however, this method shows no auditory preference if only the fundamental frequency (F0) is considered without prosody or spectrum.

The recent documents disclosed some methods to enhance the expressive capability of TTS. These methods usually require considerable efforts on the collection of various speaking styles of corpora. In addition, they also need lots of post-processing tasks, e.g. phonetic labeling and segmentation checking. In other words, the construction of a prosody-rich TTS system is quite time-consuming. As a consequence, some documents proposed to provide TTS systems with diverse prosody information via some additional tools. For example, a tool-based system could provide users with a plurality of manners to modify prosody, e.g. a GUI for users to adjust the pitch contour, and re-synthesize speech according to the new pitch information or using markup language to alter the prosody. However, most people do not know how to revise pitch contours correctly through a GUI tool. Similarly, few people are familiar with the usage of XML tags. Therefore, such the tool-based systems are inconvenient to use in practice.

Several patents regarding TTS are also published. For instance, monitoring TTS output quality to effect control of barge-in, controlling reading speed in a TTS system, a Mandarin prosody transformation system, concatenation-based Mandarin TTS with prosody control, TTS prosody prediction method and speech synthesis system, etc.

For example, FIG. 1 shows a Mandarin prosody transformation system 100 which uses a prosody analysis unit 130 to receive a source speech and the corresponding text. Prosody information can be extracted by the prosody analysis unit that is composed of a hierarchical decomposition module 131, a prosody transformation function selection module 132 and a prosody transformation module 133. Finally, the prosody information is sent to the speech synthesis module 150 so as to generate the synthesized speech.

FIG. 2 shows a speech synthesis system and method. The document disclosed a TTS system with foreign language capabilities. The system analyzes input text data 200 to obtain language information 204*a* by applying language analysis module 204 at the beginning. Next, the linguistic information is passed to a prosody prediction module 209 to generate the prosody information 209*a*. Then a speech-unit selection module 208 selects a sequence of speech segments that better matched the linguistic and prosody information. Finally, a speech synthesis module 210 is used to synthesize speech 211.

SUMMARY

The exemplary embodiments may provide a controllable prosody re-estimation system and method and computer program product thereof.

A disclosed exemplary embodiment relates to a controllable prosody re-estimation system. The system comprises a controllable prosody parameter interface and a speech-to-speech/text-to-speech (STS/TTS) core engine. The main concept of this controllable prosody parameter interface is to provide users with an easy and intuitive manner to input a set of controllable prosody parameters. The STS/TTS core engine consists of a prosody prediction/estimation module, a prosody re-estimation module and a speech synthesis module. The prosody prediction/estimation module predicts or estimates prosody information according to the input text or speech, and transmits the predicted or estimated prosody information to the prosody re-estimation module. The prosody re-estimation module re-estimates and generates new prosody information according to the received prosody information and a set of controllable parameters. Finally, the speech synthesis module produces synthesized speech.

Another disclosed exemplary embodiment relates to a controllable prosody re-estimation system, which is executable on a computer system. The computer system comprises a memory device used to store a recorded speech corpus and a synthesized speech corpus. The prosody re-estimation system comprises a controllable prosody parameter interface and a processor. The processor includes a prosody prediction/estimation module, a prosody re-estimation module and a speech synthesis module. The prosody prediction/estimation module predicts or estimates prosody information according to the input text or speech, and transmits the predicted or estimated prosody information to the prosody re-estimation module. The prosody re-estimation module re-estimates and generates new prosody information according to the received prosody information and an input controllable parameter set from the controllable prosody parameter interface. Finally, the speech synthesis module generates synthesized speech according to the new prosody information. Note that the processor constructs a prosody re-estimation model used in the prosody re-estimation module according to the statistics of prosody difference between a recorded speech corpus and a synthesized one.

Yet another disclosed exemplary embodiment relates to a controllable prosody re-estimation method. The method includes: a controllable prosody parameter interface which receives a set of controllable parameters; the ability of predicting/estimating prosody information according to the input text/speech; the construction of a prosody re-estimation model; the prosody re-estimation which generates the new prosody information according to a set of controllable parameters and predicted/estimated prosody information; the generation of synthesized speech which is performed by a speech synthesis module with the new prosody information.

Yet another disclosed exemplary embodiment relates to a computer program product for controllable prosody re-estimation. The computer program product includes a memory and an executable computer program stored in the memory. The executable computer program runs on a processor executes: a controllable prosody parameter interface which receives a set of controllable parameters; the functionality of predicting/estimating prosody information according to the input text/speech; the construction of a prosody re-estimation model; the prosody re-estimation which generates the new prosody information according to a set of controllable parameters and predicted/estimated prosody information; the generation of synthesized speech which is performed by a speech synthesis module with the new prosody information.

The foregoing and other features, aspects and advantages of the present invention will become better understood from a careful reading of a detailed description provided herein below with appropriate reference to the accompanying drawings.

DETAILED DESCRIPTION OF THE EXEMPLARY EMBODIMENTS

The exemplary embodiments describe a controllable prosody re-estimation system and method and a computer program product thereof that enrich the prosody of TTS so as to have similar intonation of source recording. Moreover, a controllable prosody adjustment is proposed to have diverse prosody and better naturalness for TTS applications. In the exemplary embodiments, the predicted prosody information is taken as the initial value and a prosody re-estimation module is used to calculate new prosody information. In addition, an interface for a set of controllable parameters is provided to make prosody rich. Here the prosody re-estimation module includes a prosody re-estimation model that is constructed by gathering statistics of prosody difference between a recorded speech corpus and a TTS synthesized speech corpus.

Figure 1:
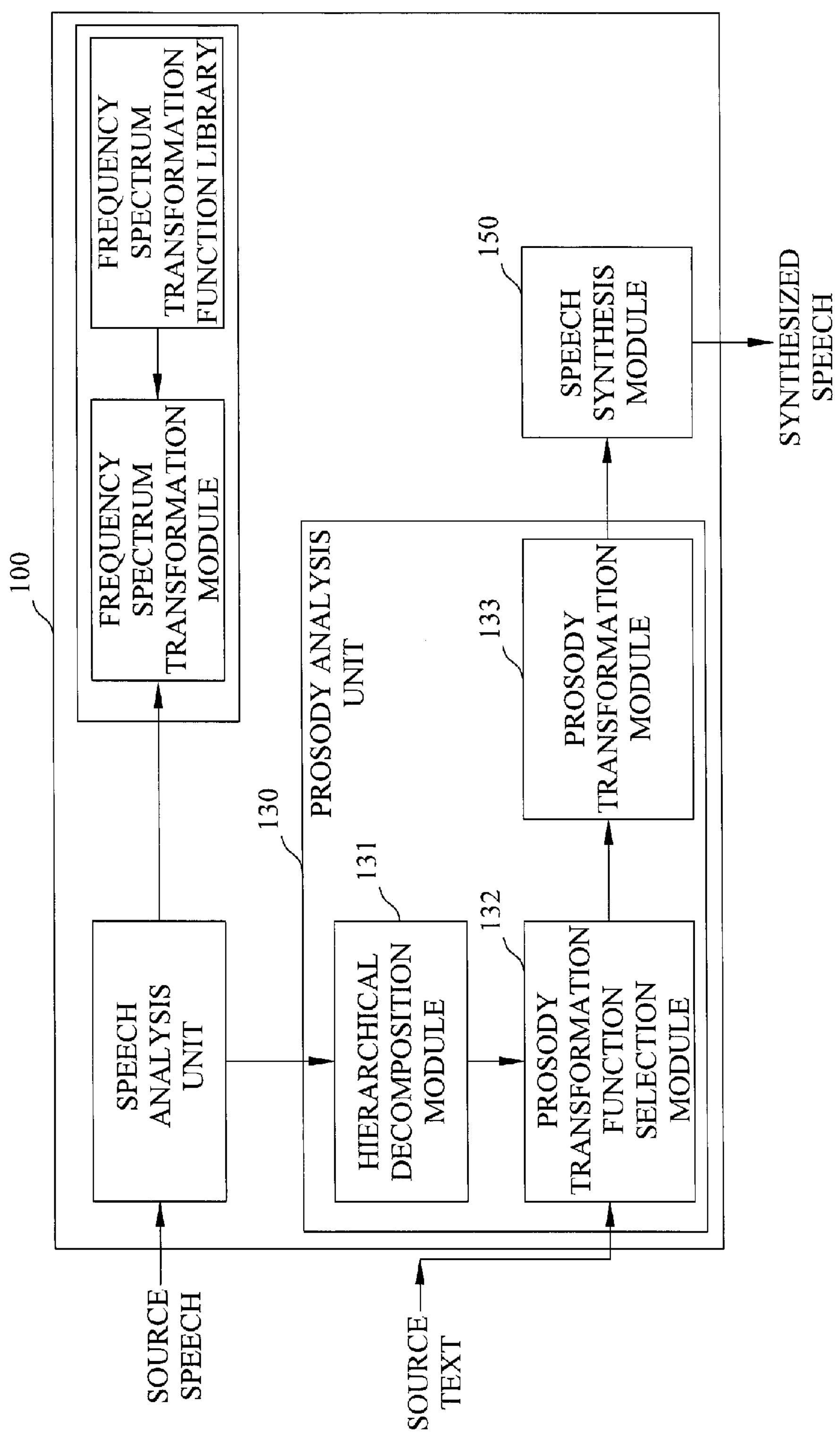
FIG. 1 (PRIOR ART)
FIG. 1 shows an exemplary schematic view of a Mandarin prosody transformation system.
Figure 2:
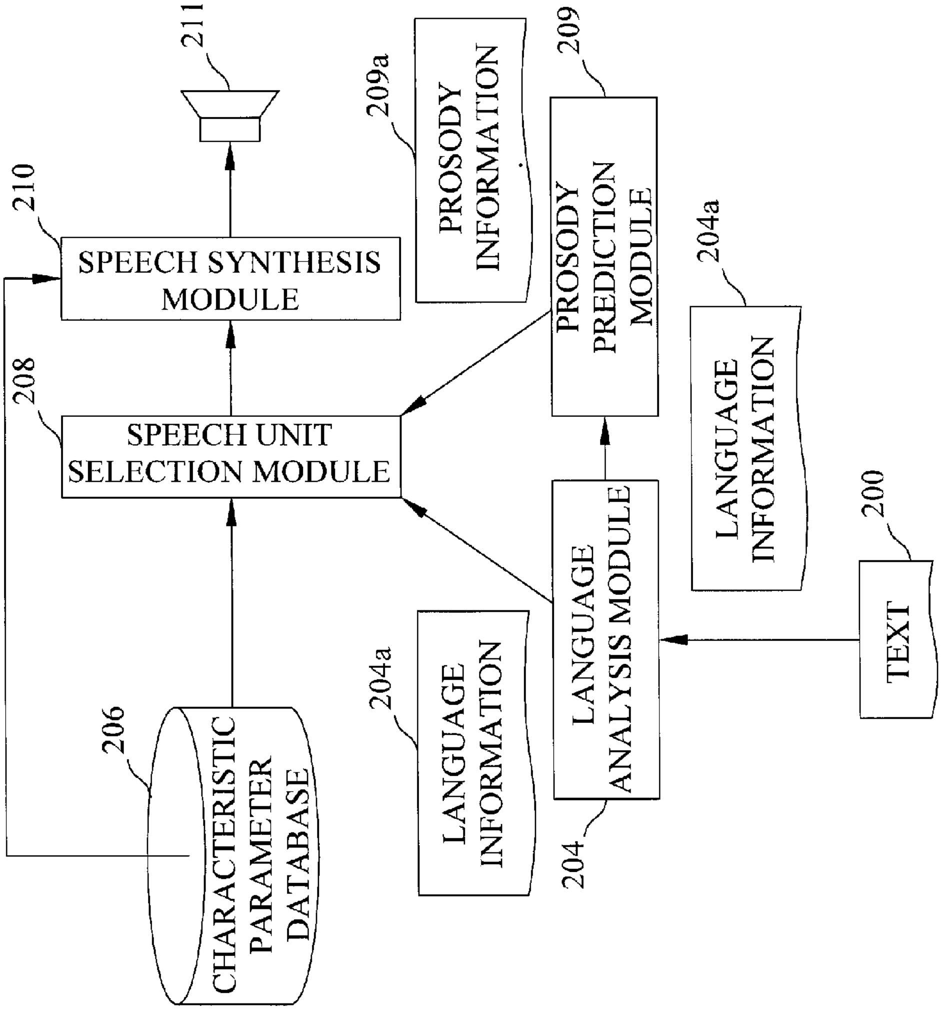
FIG. 2 (PRIOR ART)
FIG. 2 shows an exemplary schematic view of speech synthesis system and method.
Figure 3:
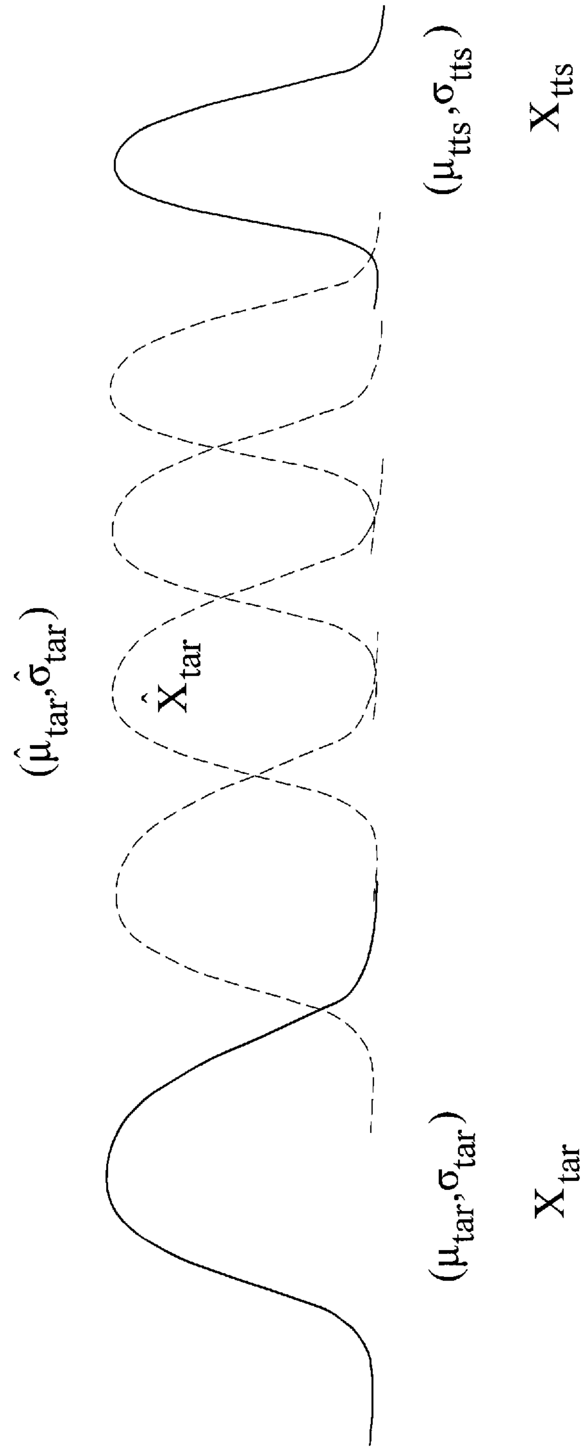
FIG. 3 shows an exemplary schematic view of the expressions for various prosody distributions, consistent with certain disclosed embodiments.

Before describing how to use controllable prosody parameters to generate rich prosody in detail, it is essential to present the construction of a prosody re-estimation model. FIG. 3 shows an exemplary schematic view for various prosody distributions, consistent with certain disclosed embodiments. In FIG. 3, $X_{tts}$ represents the prosody information generated by a TTS system, and the distribution of $X_{tts}$ is specified by the mean $\mu_{tts}$ and standard deviation $\sigma_{tts}$, shown as $(\mu_{tts}, \sigma_{tts})$. $X_{tar}$ is the target prosody, the distribution of $X_{tar}$ is specified by $(\mu_{tar}, \sigma_{tar})$. If both $(\mu_{tts}, \sigma_{tts})$ and $(\mu_{tar}, \sigma_{tar})$ are known, $X_{tar}$ could be re-estimated accordingly based on the statistical difference between the two distributions, $(\mu_{tts}, \sigma_{tts})$ and $(\mu_{tar}, \sigma_{tar})$. The normalized statistical equivalent is defined as:

$$(X_{tar}-\mu_{tar})/\sigma_{tar}=(X_{tts}-\mu_{tts})/\sigma_{tts} \quad (1)$$

By expanding the concept of prosody re-estimation, as shown in FIG. 3, various prosody distributions $(\hat{\mu}_{tar}, \hat{\sigma}_{tar})$ may be calculated by applying an interpolation method between $(\mu_{tts}, \sigma_{tts})$ and $(\mu_{tar}, \sigma_{tar})$. As a result, it is simple to provide rich prosody $\hat{X}_{tar}$ to TTS systems.

There is always prosody difference between TTS synthesized speech and recorded speech no matter which training method is employed. In other words, if a prosody compensation mechanism for a TTS system could reduce the prosody difference, it would be able to generate synthesized speech with higher naturalness. Therefore, the exemplary embodiments describe an effective system which is constructed based on a re-estimation model that can be used to improve the pitch prediction.

Figure 4:
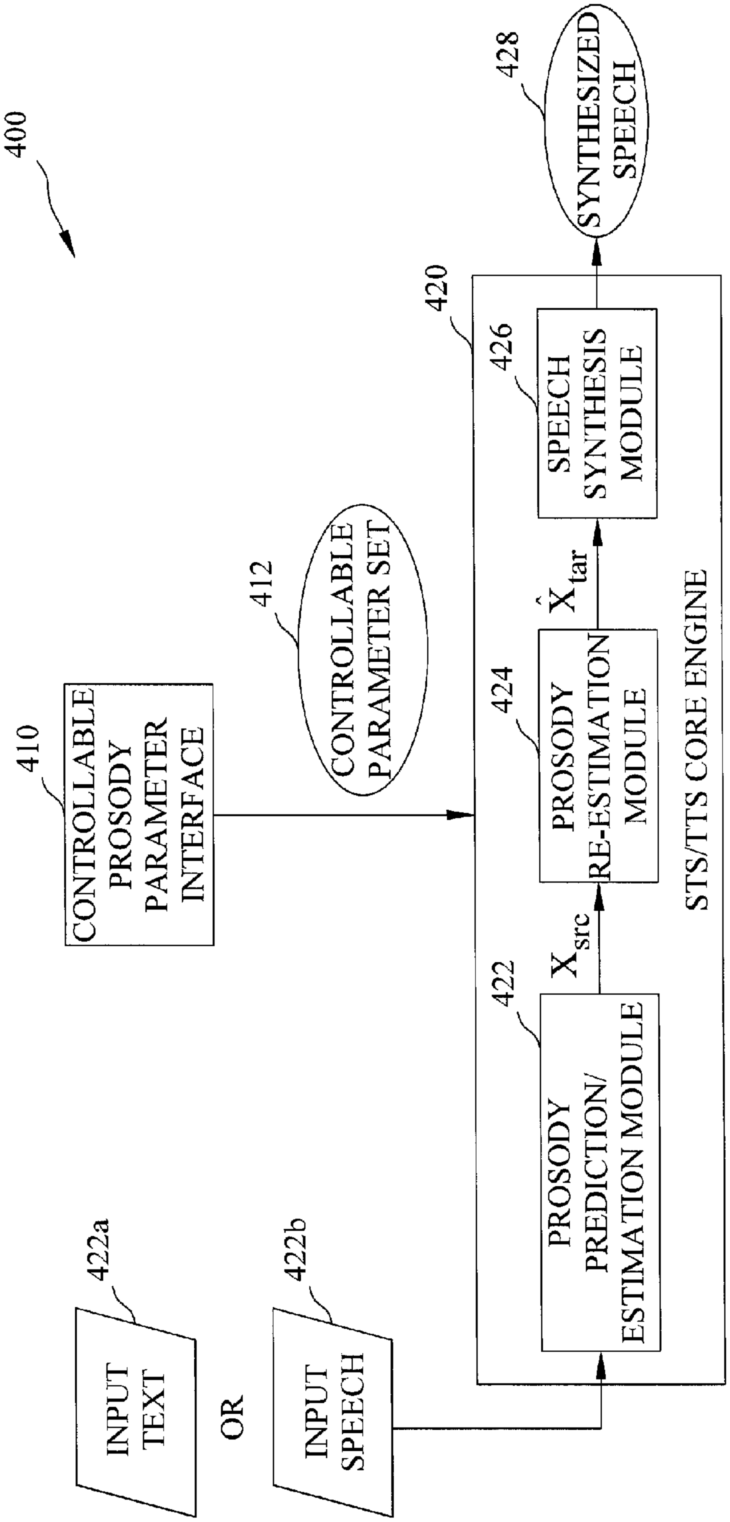
FIG. 4 shows an exemplary schematic view of a controllable prosody re-estimation system, consistent with certain disclosed embodiments.

FIG. 4 shows an exemplary schematic view of a controllable prosody re-estimation system. As shown in FIG. 4, prosody re-estimation system 400 may comprise a controllable prosody parameter interface 410 and a speech-to-speech/text-to-speech (STS/TTS) core engine 420. Controllable prosody parameter interface 410 is used to load a controllable parameter set 412. Core engine 420 may consist of a prosody prediction/estimation module 422, a prosody re-estimation module 424 and a speech synthesis module 426. Based on the input text 422*a* or the input speech 422*b*, prosody prediction/estimation module 422 predicts or estimates prosody information $X_{src}$, and transmits it to prosody re-estimation module 424. Based on the input controllable parameter set 412 and the received prosody information $X_{src}$, prosody re-estimation module 424 re-estimates prosody information $X_{src}$ and produces new prosody information, i.e., adjusted prosody information $\hat{X}_{tar}$, and finally applies speech synthesis module 426 to generate synthesized speech 428.

In the exemplary embodiments of the disclosure, how to obtain prosody information $X_{src}$ depends on the input data type. If the input data is an utterance, the prosody extraction is performed by a prosody estimation module. However, if the input data is a text sentence, the prosody extraction is performed by a prosody prediction module. Controllable parameter set 412 includes at least three independent parameters. The number of the input parameters can be determined according to users' preference; it could be probably zero, one, two, or three. The system will assign default values automatically to those parameters which have not been specified yet by users. Prosody re-estimation module 424 may re-estimate prosody information $X_{src}$ according to equation (1). The default values for these parameters of controllable parameter set 412 may be calculated by comparing two parallel corpora. The two parallel corpora are the aforementioned recorded speech corpus and the synthesized speech corpus, respectively. The statistical methods include static distribution method and dynamic distribution method.

Figure 5:
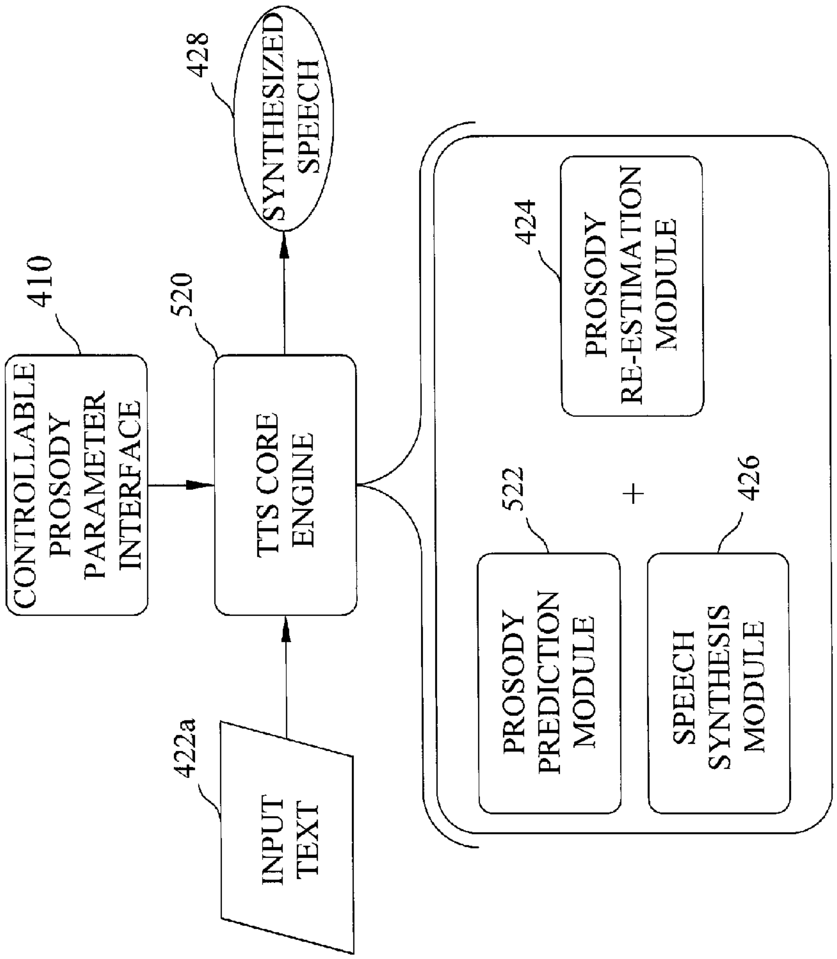
FIG. 5 shows an exemplary schematic view of applying a prosody re-estimation system of FIG. 4 to a TTS system, consistent with certain disclosed embodiments.
Figure 6:
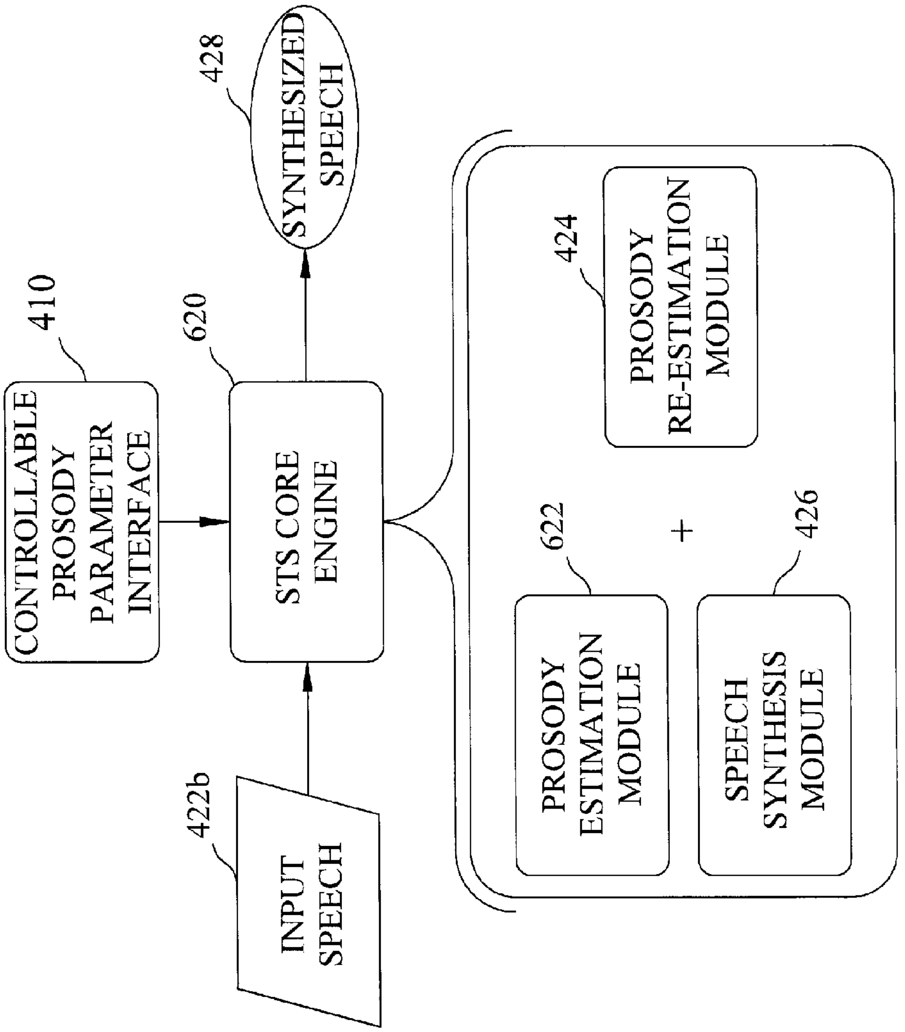
FIG. 6 shows an exemplary schematic view of applying a prosody re-estimation system of FIG. 4 to a speech-to-speech (STS) system, consistent with certain disclosed embodiments.

FIG. 5 and FIG. 6 show exemplary schematic views of prosody re-estimation system 400 applied to TTS and STS respectively, consistent with certain disclosed embodiments. If prosody re-estimation system 400 is applied to TTS applications, STS/TTS core engine 420 in FIG. 4 means TTS core engine 520 in FIG. 5. Prosody prediction/estimation module 422 in FIG. 4 is prosody prediction module 522 in FIG. 5 that predicts the prosody information according to the input text 422*a*. In FIG. 6, if prosody re-estimation system 400 is applied to STS applications, STS/TTS core engine 420 in FIG. 4 is STS core engine 620 in FIG. 6. Prosody prediction/estimation module 422 in FIG. 4 means prosody estimation module 622 in FIG. 6 which can predict the prosody information according to the input speech 422*b*.

Figure 7:
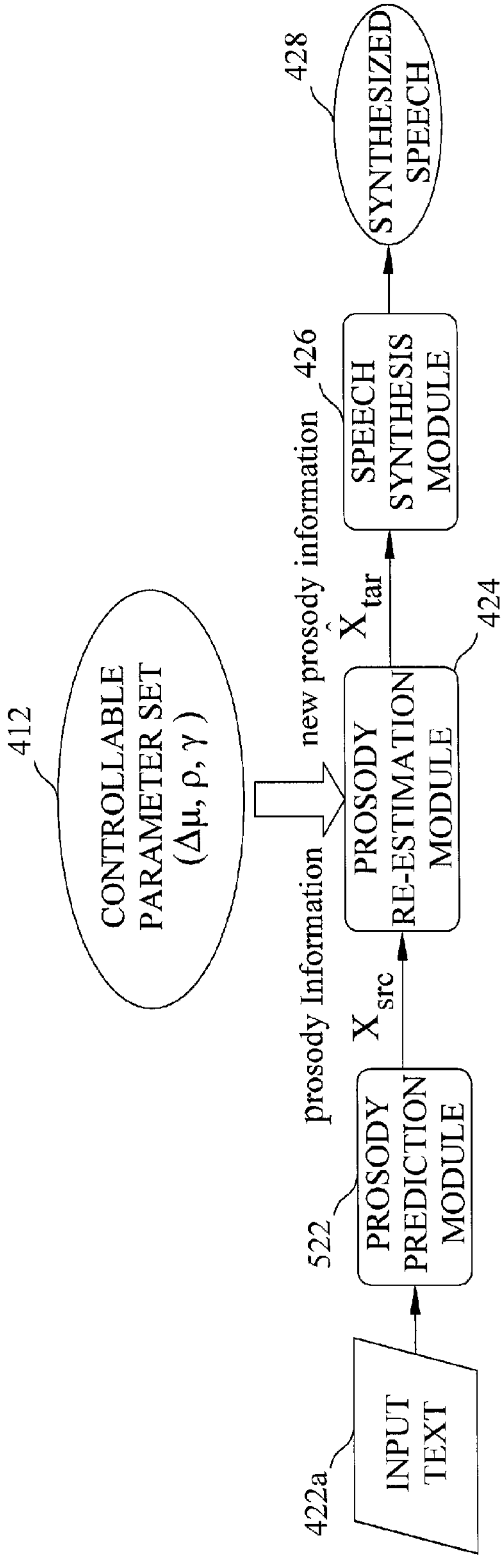
FIG. 7 shows an exemplary schematic view illustrating the relation between the prosody re-estimation module and the other modules when the prosody re-estimation system applied to a TTS system, consistent with certain disclosed embodiments.
Figure 8:
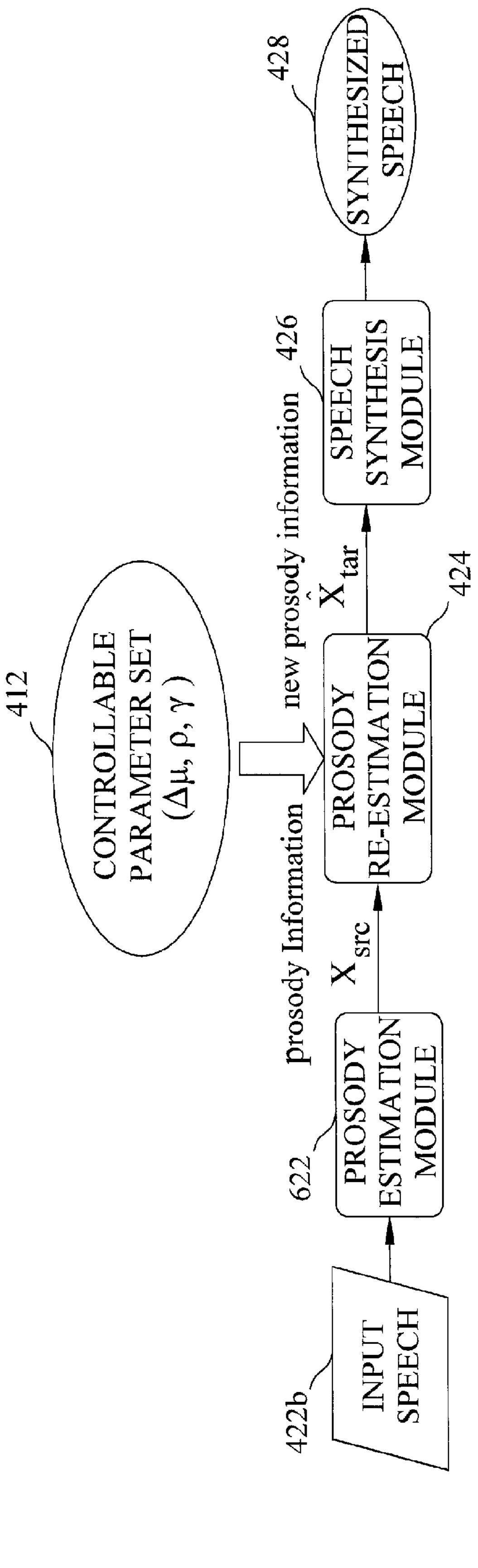
FIG. 8 shows an exemplary schematic view illustrating the relation between the prosody re-estimation module and the other modules when the prosody re-estimation system applied to a STS system, consistent with certain disclosed embodiments.

FIG. 7 and FIG. 8 show exemplary schematic views of the relation between prosody re-estimation module and other modules when prosody re-estimation system 400 applied on TTS and STS respectively, consistent with certain disclosed embodiments. In FIG. 7, if prosody re-estimation system 400 is applied to TTS applications, prosody re-estimation module 424 receives prosody information $X_{src}$ predicted by prosody prediction module 522 and loads three controllable parameters ($\Delta\mu$, $\rho$, $\gamma$) of controllable parameter set 412, and then uses a prosody re-estimation model to adjust the prosody information $X_{src}$ to a new prosody information, $\hat{X}_{tar}$. Finally, $\hat{X}_{tar}$ is transmitted to speech synthesis module 426.

In FIG. 8, if prosody re-estimation system 400 is applied to STS applications, prosody re-estimation module 424 receives prosody information $X_{src}$ estimated by prosody estimation module 622, instead of the prediction one as in FIG. 7. The remaining of the operation is identical to FIG. 7, and thus is omitted here. The details of three controllable parameters ($\Delta\mu$, $\rho$, $\gamma$) and the prosody re-estimation model will be described later.

Figure 9:
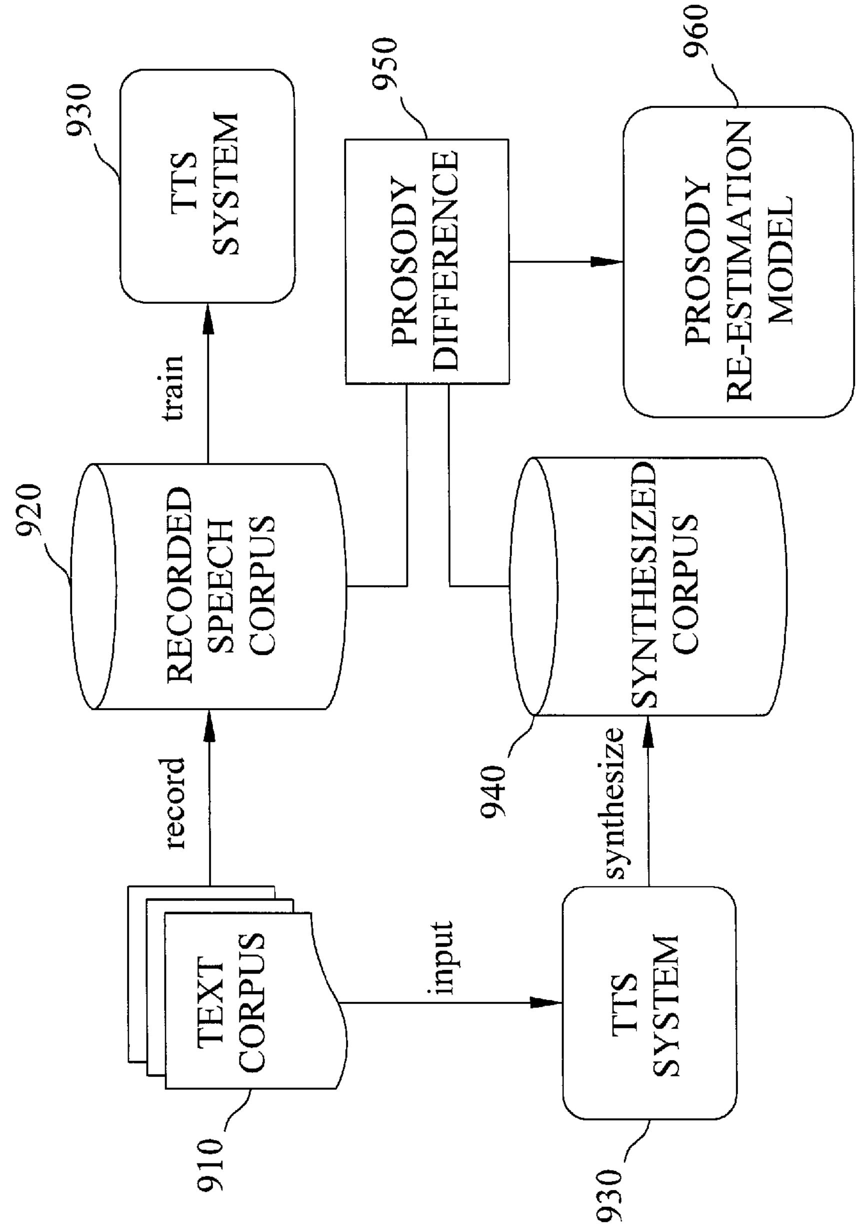
FIG. 9 shows an exemplary schematic view illustrating how to construct a prosody re-estimation model, where TTS application is taken as an example, consistent with certain disclosed embodiments.

FIG. 9 shows an exemplary schematic view illustrating how to construct a prosody re-estimation model, where TTS applications are taken as an example, consistent with certain disclosed embodiments. In the construction stage of the prosody re-estimation model, two speech corpora with identical sentences are required. One is a source corpus and the other is a target corpus. In FIG. 9, the source corpus is a recorded speech corpus 920 that is collected by recording a text corpus 910. Then, a TTS system 930 is constructed by using a training method, e.g. HMM-based one. Once the TTS system 930 is constructed, a synthesized speech corpus 940 can be generated by synthesizing the same text corpus 910 with the trained TTS system 930. This synthesized speech corpus is the target corpus.

Because the recorded speech corpus 920 and the synthesized speech corpus 940 are two parallel corpora, prosody difference 950 could be estimated directly by simple statistics. In the exemplary embodiments of the present disclosure, two statistical methods are adopted to calculate the prosody difference 950 and to construct a prosody re-estimation model 960. One is a static distribution method, and the other is a dynamic distribution one, described as follows.

The static distribution method is a straightforward embodiment of the concept mentioned above. If ($\mu_{tar}$, $\sigma_{tar}$) in equation (1) is rewritten as ($\mu_{rec}$, $\sigma_{rec}$) to represent the mean and standard deviation of the recorded speech corpus, the prosody re-estimation equation can be expressed as follows:

$$\frac{X_{rec}-\mu_{rec}}{\sigma_{rec}}=\frac{X_{tts}-\mu_{tts}}{\sigma_{tts}}, \tag{2}$$

where $X_{tts}$ is the predicted prosody by the TTS system, and $X_{rec}$ is the prosody of the recorded speech. In other words, a given $X_{tts}$ should be modified according to the following equation:

$$X_{rst}=\mu_{rec}+(X_{tts}-\mu_{tts})\frac{\sigma_{rec}}{\sigma_{tts}}, \tag{3}$$

so that the modified prosody $X_{rst}$ can approximate the prosody of the recorded speech.

Figure 10:
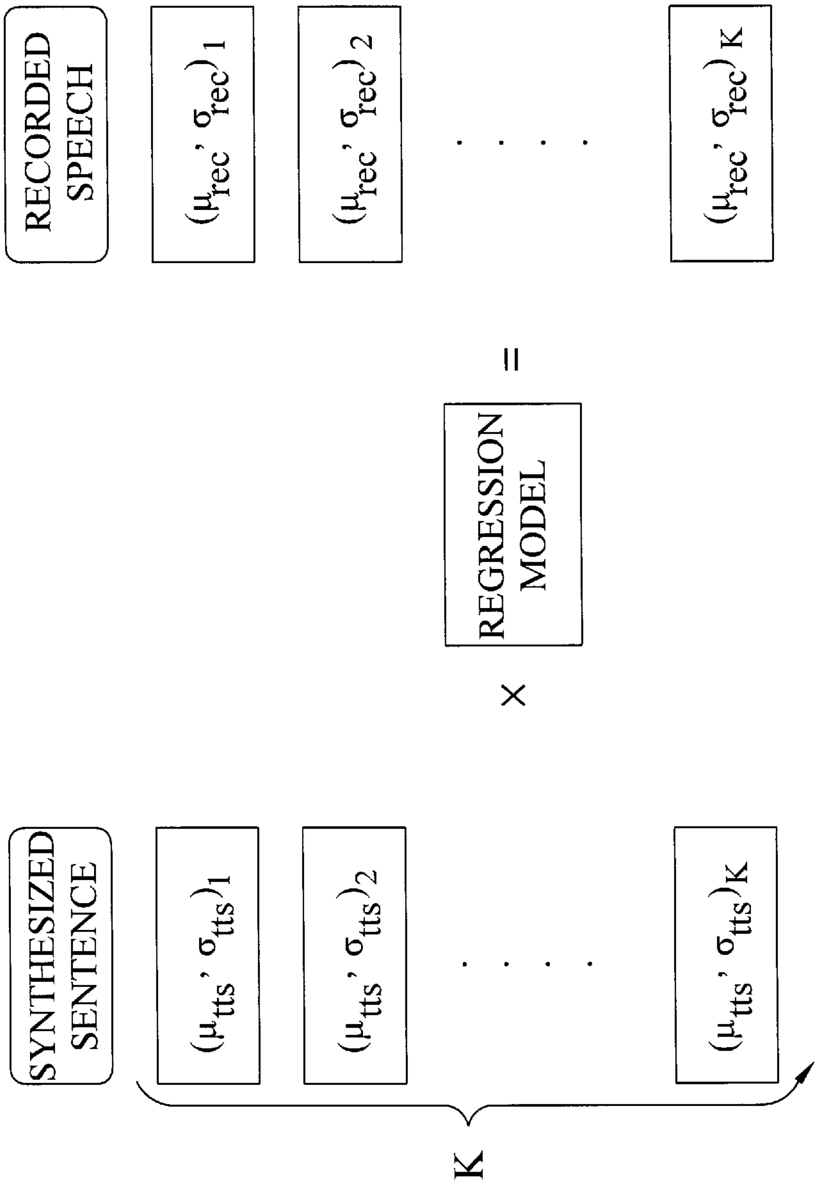
FIG. 10 shows an exemplary schematic view of generating a regression model, consistent with certain disclosed embodiments.

As for the dynamic distribution method, ($\mu_{rec}$, $\sigma_{rec}$) is dynamically estimated based on the predicted pitch information of the input sentence. The method is described as follows: (1) for each parallel sequence pair, i.e., each synthesized speech sentence and each recorded speech sentence, compute their prosody distributions, ($\mu_{tts}$, $\sigma_{tts}$) and ($\mu_{rec}$, $\sigma_{rec}$). (2) Assume that K pairs of prosody distributions are computed, labeled as $(\mu_{tts}, \sigma_{tts})_1$ and $(\mu_{rec}, \sigma_{rec})_1$ to $(\mu_{tts}, \sigma_{rec})_K$ and $(\mu_{rec}, \sigma_{rec})_K$, then a regression model (RM) may be constructed by using a regression method, such as, least squared error estimation method, Gaussian mixed model, support vector machine, neural network, etc. (3) In the synthesis stage, a TTS system first predicts the initial prosody distribution ($\mu_s$, $\sigma_s$) of the input sentence, and then the RM is applied to obtain the new prosody distribution ($\hat{\mu}_s$, $\hat{\sigma}_s$), i.e., the target prosody distribution of the input sentence. FIG. 10 shows an exemplary schematic view of generating a regression model, consistent with certain disclosed embodiments, wherein RM is constructed by using the least square error estimation method. Therefore, in the synthesis stage, the target prosody distribution may be predicted by multiplying the initial prosody information with RM. That is, the RM could be used to predict the target prosody distribution of any input sentence.

After the prosody re-estimation model is constructed (either by static distribution method or dynamic distribution one), the exemplary embodiment of the present disclosure extends its usage further to enable a TTS/STS system to generate richer prosody, as described in the following.

Equation (3) is reinterpreted to a more general form by replacing the tts with src as the following equation:

$$\begin{aligned} X_{rst} &= (\mu_{rec}-\mu_{src})+\left[\mu_{src}+(X_{src}-\mu_{scr})\frac{\sigma_{rec}}{\sigma_{src}}\right] \\ &= \Delta\mu+[\mu_{src}+(X_{src}-\mu_{src})\gamma_{\sigma}], \end{aligned} \tag{4}$$

where $\Delta\mu$ represents the pitch level shift and $[\mu_{src}+(X_{src}-\mu_{src})\gamma_{\sigma}]$ represents the pitch contour shape with a fixed mean value, $\mu_{src}$. In theory, $\gamma_\sigma$ should not be negative. However, in order to get more flexible control on the pitch contour shape, the restriction is removed accordingly.

Furthermore, $\gamma_\sigma$ is split into two parameters, ρ and γ which represent the shape's direction and volume, respectively. Consequently, equation (4) is changed to equation (5):

$$X_{rst}=\Delta\mu+[\mu_{src}+(X_{src}-\mu_{src})\rho\cdot\gamma] \quad (5)$$

When prosody re-estimation model adopts this form of expression, three parameters (Δμ, ρ, γ) could be changed independently to obtain richer prosody. Each parameter has its own valid value set shown as follows:

$$\Delta\mu_{min}<\Delta\mu<\Delta\mu_{max},\rho=\{1,0-1\},0<\gamma<\gamma_{max}$$

If the ranges of $X_{rst}$ and γ are both given, then the range of Δμ is determined accordingly. Similarly, when the ranges of $X_{rst}$ and Δμ are specified, $\gamma_{max}$ can be calculated subsequently. Besides, ρ has three different values used to determine the comparative direction to the original pitch contour shape. If ρ is 1, the direction of the re-estimated pitch shape will be the same with that of the original one. If ρ is 0, the shape will be flat, thus the synthesized voices sound like what a robot makes. If ρ is −1, the direction of the shape will be opposite compared to the original one, which makes the synthesized voices perceived like a foreign accent. In addition, low-spirited and excited voices could be synthesized under some appropriate combinations of Δμ and γ.

Therefore, it makes expressive speech possible by using these control parameters. In the present disclosure, prosody re-estimation system 400 provides a controllable prosody parameter interface 410 to change the three parameters. When some of the three parameters are omitted from the input, system will assign default values to them. The default values of the three parameter are shown as below:

$$\Delta\mu=\mu_{rec}-\mu_{src},\rho=1,\gamma=\sigma_{rec}/\sigma_{src}$$

wherein $\mu_{src}$, $\mu_{rec}$, $\sigma_{src}$, $\sigma_{rec}$ could be obtained via the statistical computation on the aforementioned two parallel corpora.

Figure 11:
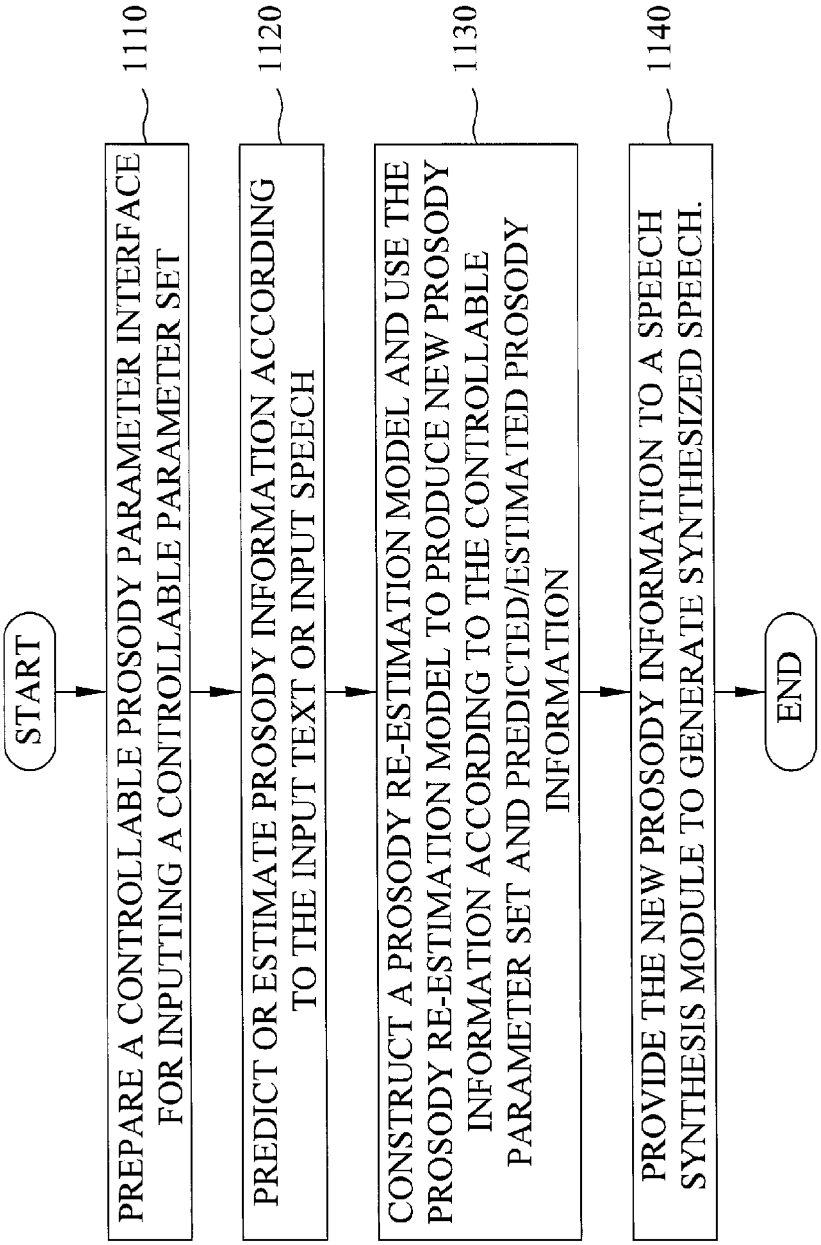
FIG. 11 shows an exemplary flowchart of a controllable prosody re-estimation method, consistent with certain disclosed embodiments.

FIG. 11 shows an exemplary flowchart of a controllable prosody re-estimation method, consistent with certain disclosed embodiments. In FIG. 11, a controllable prosody parameter interface is prepared for loading a controllable parameter set at the first, as shown in step 1110. In step 1120, prosody information is predicted or estimated according to the input text or speech. Next, a prosody re-estimation model is constructed and then it is employed to produce new prosody information according to the controllable parameter set and predicted/estimated prosody information, as shown in step 1130. Finally, the new prosody information is provided to a speech synthesis module to generate synthesized speech, as shown in step 1140.

The details of each step in FIG. 11, such as input and control of controllable parameter set in step 1110, construction and expression form of prosody re-estimation model in step 1120 and prosody re-estimation in step 1130, are the same as aforementioned, thus are omitted here.

Figure 12:
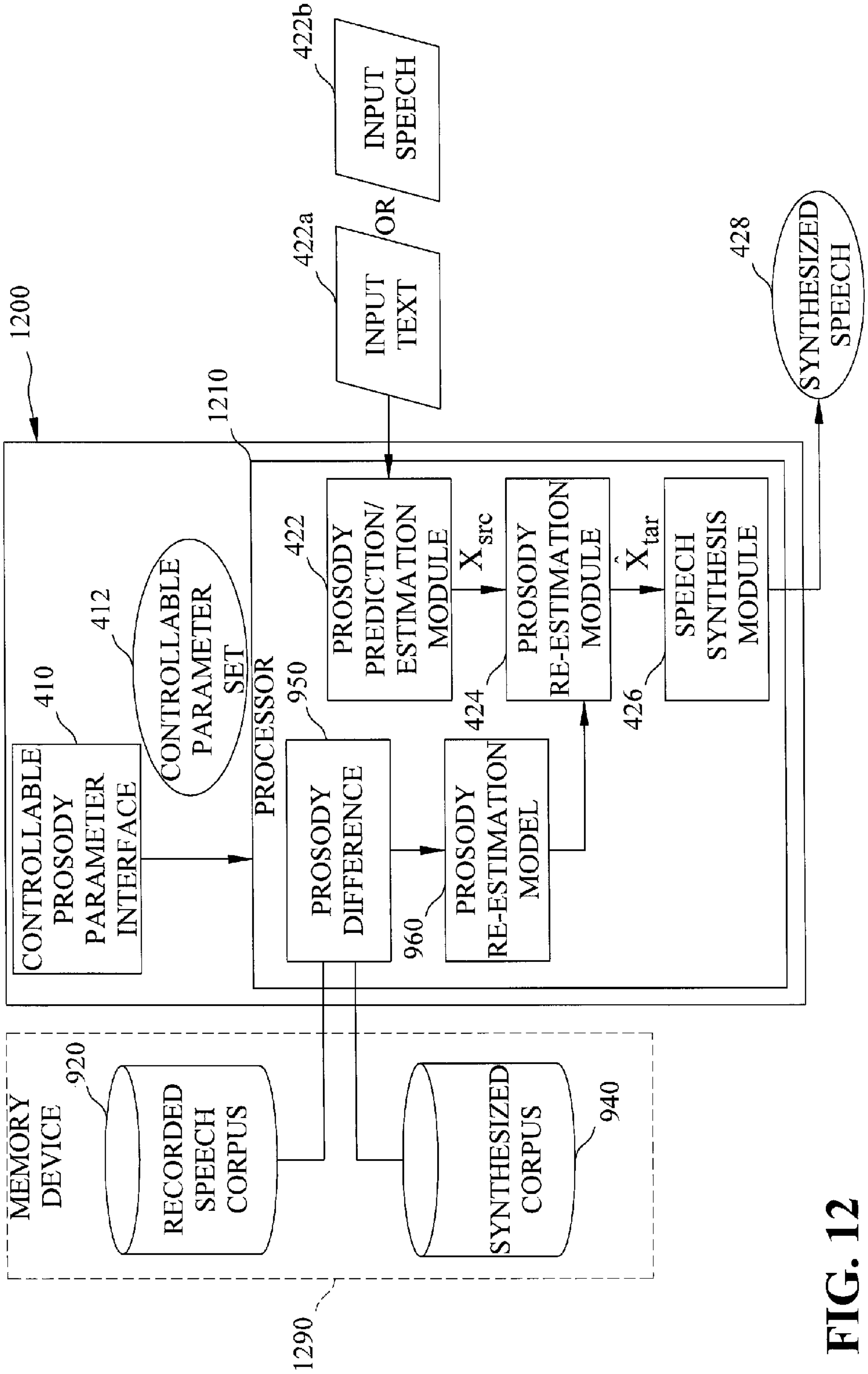
FIG. 12 shows an exemplary schematic view of executing a prosody re-estimation system on a computer system, consistent with certain disclosed embodiments.

The disclosed prosody re-estimation system may also be executed on a computer system. The computer system (not shown) includes a memory device that is used to store recorded speech corpus 920 and synthesized speech corpus 940. As shown in FIG. 12, prosody re-estimation system 1200 comprises controllable prosody parameter interface 410 and a processor 1210. Processor 1210 may include prosody prediction/estimation module 422, prosody re-estimation module 424 and speech synthesis module 426. In other words, Processor 1210 operates based on the aforementioned functions of prosody prediction/estimation module 422, prosody re-estimation module 424 and speech synthesis module 426. According to the statistical prosody difference between the two corpora in memory device 1290, processor 1210 may construct the aforementioned prosody re-estimation module 424. Processor 1210 may be a processor in a computer system.

The disclosed exemplary embodiments may also be realized with a computer program product. The computer program product includes at least a memory and an executable computer program stored in the memory. The computer program may be executed according to the order of steps 1110-1140 of FIG. 11 via a processor or a computer system. The processor may also use prosody prediction/estimation module 422, prosody re-estimation module 424, speech synthesis module 426 and controllable prosody parameter interface 410 and it operates based on the aforementioned functions provided by prosody prediction/estimation module 422, prosody re-estimation module 424 and speech synthesis module 426. If any of the aforementioned three parameters (Δμ, ρ, γ) is omitted from the input, the corresponding default value shall be used. The details are the same as the earlier description, and thus are omitted here.

A series of experiments is conducted in the disclosure to prove the feasibility of the exemplary embodiments. First, a HMM-based TTS system is trained with a corpus of 2605 Chinese Mandarin sentences and the prosody re-estimation model is constructed subsequently. Then a static distribution method and a dynamic distribution method are used for pitch level validation. This is because the pitch correctness is highly related to the naturalness of prosody. To evaluate the performance of pitch prediction, the measurement unit could be a phone, a final, a syllable or a word, etc. The final is chosen as the performance measurement unit for pitch prediction due to the fact a Mandarin final is composed of a nucleus and an optional nasal coda, which are all voiced.

Figure 13:
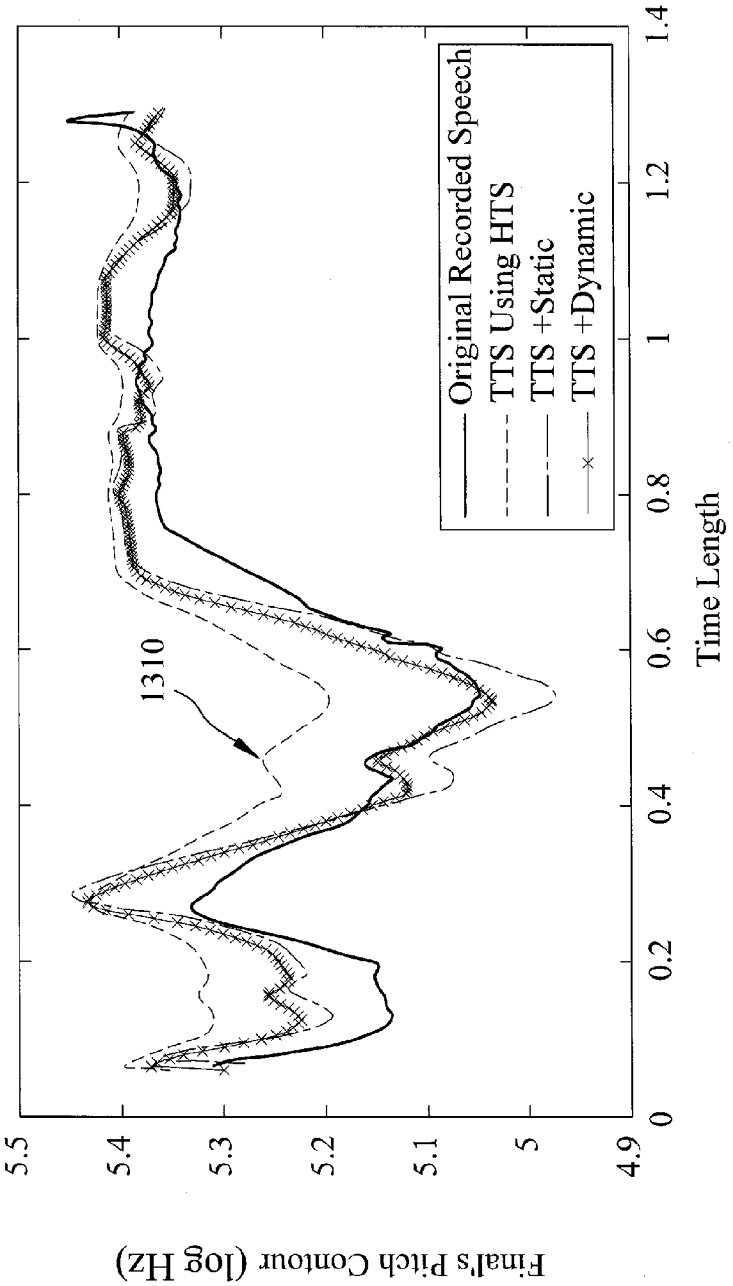
FIG. 13 shows an exemplary schematic view of four kinds of pitch contours for a sentence, consistent with certain disclosed embodiments.
Figure 14:
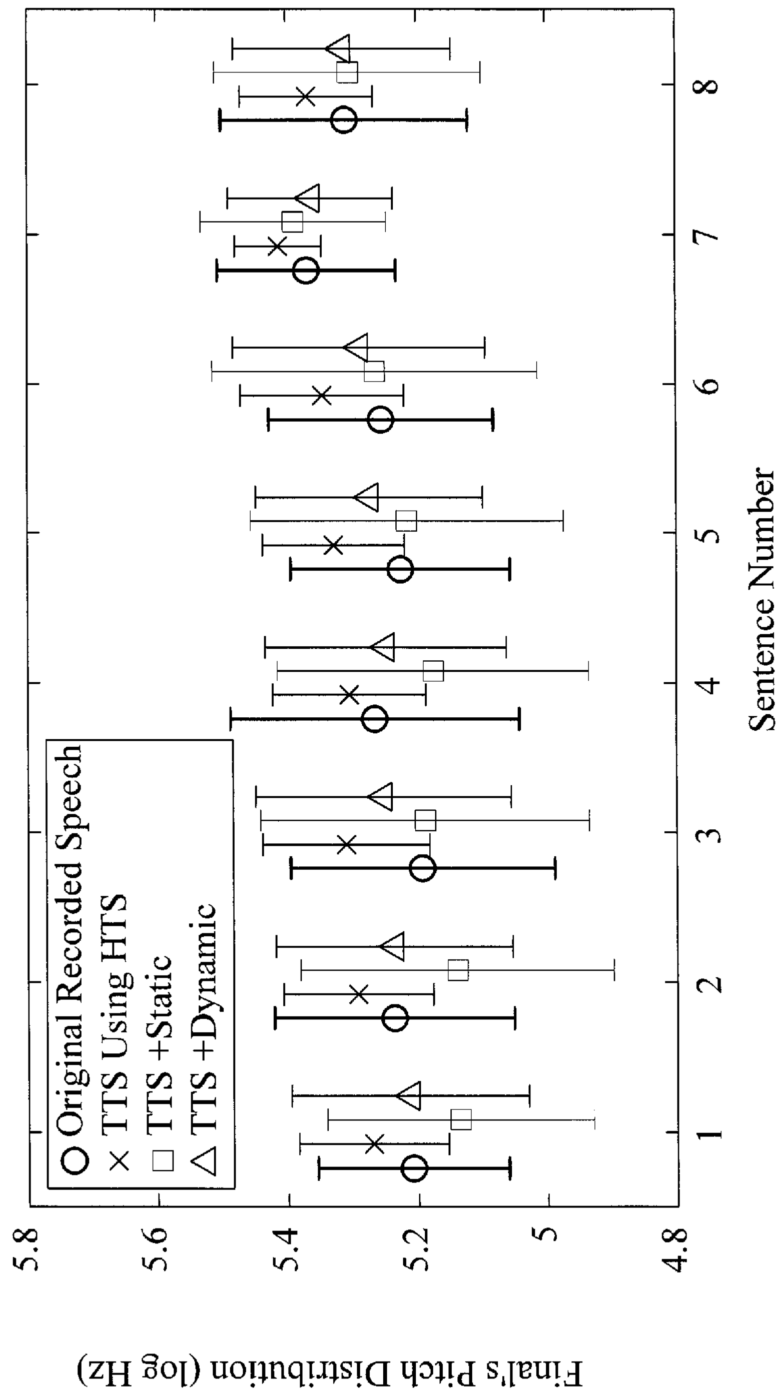
FIG. 14 shows an exemplary schematic view illustrating means and standard deviations of 8 different sentences for the four kinds of pitch contours in FIG. 13, consistent with certain disclosed embodiments.

FIG. 13 shows an exemplary schematic view of four kinds of pitch contours for a sentence, including recorded speech, TTS using HTS, TTS using static distribution and TTS using dynamic distribution, consistent with certain disclosed embodiments, wherein the x-axis represents the length of the sentence (second as unit), and y-axis represents the final's pitch contour, with log Hz as unit. It may be seen from FIG. 13 that the pitch contour 1310 for TTS using HTS (one of HMM-based method) shows the over-smoothing problem. FIG. 14 shows an exemplary schematic view illustrating means and standard deviations of 8 different sentences for the four kinds of pitch contours in FIG. 13, where x-axis represents the sentence number and the y-axis represents the mean±standard deviation, with log Hz as unit. It may be seen from FIG. 13 and FIG. 14, in comparison with the TTS using conventional HTS, the disclosed exemplary embodiments (either using static or dynamic distribution) may generate more similar prosody to that of the recorded speech.

Two kinds of listening tests, including preference test and similarity test, are also included in the present invention. The experimental results show that the disclosed re-estimated synthesized speech is more natural than that of TTS using conventional HMM-based method, especially in the preference test. The main reason is because the re-estimated model has already ameliorated the over-smoothing problem in the original TTS system so that the re-estimated prosody becomes more natural.

Figure 15:
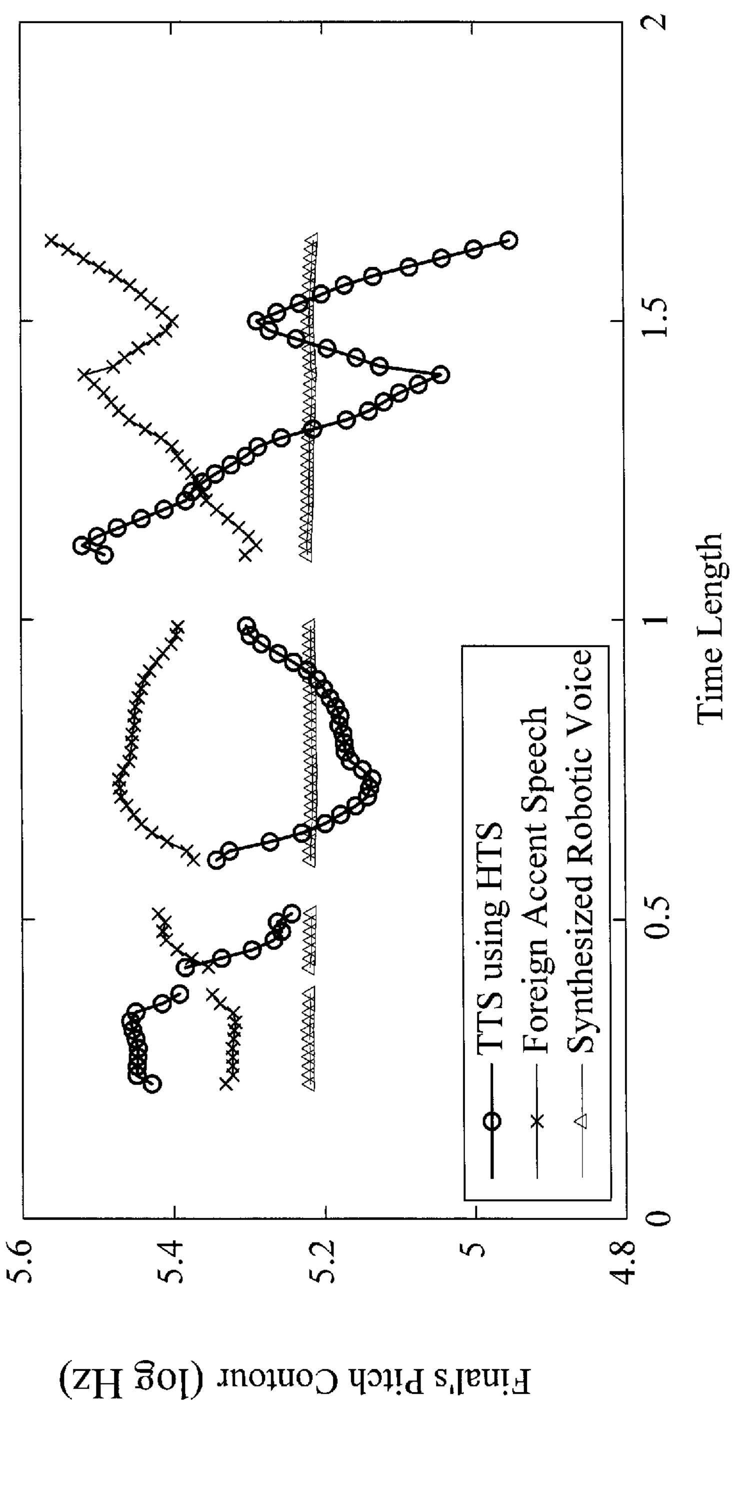
FIG. 15 shows an exemplary schematic view of three pitch contours derived by giving three different sets of controllable parameters, consistent with certain disclosed embodiments.

An experiment is devised to observe whether the prosody of TTS becomes richer when the controllable parameter set is involved. FIG. 15 shows an exemplary schematic view of three pitch contours derived by setting three different sets of parameters. The three pitch contours are extracted from three different synthesized voices, including original synthesized speech using HTS, synthesized robotic speech and foreign accented speech, where x-axis represents the sentence length (second as unit) and y-axis represents the final's pitch contour, with log Hz as unit. It can be seen from FIG. 15, for synthetic robotic voice, the re-estimated pitch contour is flat. As for the foreign accented speech, the re-estimated pitch shape is drawn in opposite direction compared to the pitch contour by HTS method. In addition, the tone of speaking is highly related to the combinations of the two parameters of $\Delta\mu$ and $\gamma$. For example, people will perceive low-spirited speech if $\Delta\mu$ is lower than 0 and $\gamma$ is lower than 1.0. However, if $\gamma$ is greater than 2.0 regardless of $\Delta\mu$, the synthesized voice will sound excited. Note that these values are effective when the evaluation unit of pitch contours is log Hz. After informal listening test, a majority of listeners agree that these speaking styles enable the current TTS prosody richer.

Therefore, the results from the experiments and the measurements for the disclosed exemplary embodiments show excellent performance. In TTS or STS applications, the disclosed exemplary embodiments may provide rich prosody as well as controllable prosody adjustments. The disclosed exemplary embodiments also show that the re-estimated synthesized speech could be robotic, foreign accented, excited, or low-spirited under some combinations of the three controllable parameters.

In summary, the disclosed exemplary embodiments provide an effective controllable prosody re-estimation system and method, applicable to speech synthesis. By taking the estimated prosody information as initial value, the disclosed exemplary embodiments may obtain new prosody information via a re-estimation model and provide a controllable prosody parameter interface so that the adjusted prosody becomes richer. The re-estimation model may be obtained via the statistical prosody difference between two parallel corpora. The two parallel corpora include the recorded training speech and synthesized speech of TTS system.

Although the present invention has been described with reference to the exemplary embodiments, it should be noted that the invention is not limited to the details described thereof. Various substitutions and modifications have been suggested in the foregoing description, and others will occur to those of ordinary skills in the art. Therefore, all such substitutions and modifications are intended to be embraced within the scope of the invention as defined in the appended claims.

What is claimed is:

1. A controllable prosody re-estimation system implemented in a computer system having at least a processing device and an input device, comprising:

a controllable prosody parameter interface responding to the input device for loading a controllable parameter set; and a speech/text to speech (STS/TTS) core engine, said core engine including at least a prosody prediction/estimation module, a prosody re-estimation module and a speech synthesis module, at least one of which is executed by said processing device, wherein said prosody prediction/estimation module predicts or estimates prosody information according to the input text/speech, and transmits the predicted or estimated prosody information to said prosody re-estimation module;

said prosody re-estimation module produces new prosody information according to said input controllable parameter set and predicted/estimated prosody information, after which said prosody re-estimation module transmits said new prosody information to said speech synthesis module to generate synthesized speech, wherein said system further constructs a prosody re-estimation model, and said prosody re-estimation module uses said prosody re-estimation model to re-estimate said prosody information so as to produce said new prosody information, wherein said prosody re-estimation model is expressed in the following form:

$$X_{rst}=\Delta\mu+[\mu_{src}+(X_{src}-\mu_{src})\rho\times\gamma]$$

wherein $X_{src}$ is prosody information generated by a source speech, $X_{rst}$ is the new prosody information, $\mu_{src}$ is the mean of prosody of a source corpus, and ($\Delta\mu$, $\rho$, $\gamma$) are three controllable parameters.

2. The system as claimed in claim 1, wherein the parameters of said controllable parameter set are fully independent.

3. The system as claimed in claim 1, wherein when said prosody re-estimation system is applied on text-to-speech (TTS), said prosody prediction/estimation module represents a prosody prediction module which predicts said prosody information according to said input text.

4. The system as claimed in claim 1, wherein when said prosody re-estimation system is applied on speech-to-speech (STS), said prosody prediction/estimation module represents a prosody estimation module which estimates said prosody information according to said input speech.

5. The system as claimed in claim 1, said system constructs said prosody re-estimation model through a recorded speech corpus and a synthesized speech corpus.

6. The system as claimed in claim 1, wherein said controllable parameter set includes a plurality of controllable parameters, and when at least a parameter of said plurality of controllable parameters is omitted from said input, said system provides a default value for said omitted controllable parameter.

7. The system as claimed in claim 1, wherein if said $\Delta\mu$ is omitted from input, said system will assign a default value ($\mu_{tar}-\mu_{src}$) to $\Delta\mu$ where $\mu_{tar}$ is the mean of prosody of a target corpus and $\mu_{src}$ is the mean of prosody of said source corpus, and if $\rho$ is omitted from input, said system will assign a default value, 1, to $\rho$, if $\gamma$ is omitted from input, said system will assign a default value, $\sigma_{tar}/\sigma_{src}$, to $\gamma$ where $\sigma_{tar}$ is the standard deviation of prosody of a target corpus and $\sigma_{src}$ is the standard deviation of prosody of said source corpus.

8. A controllable prosody re-estimation system, executed on a computer system, said computer system having a memory device which stores a recorded speech corpus and a synthesized speech corpus, said prosody re-estimation system comprising:

a controllable prosody parameter interface for loading a controllable parameter set; and a processor, said processor including at least a prosody prediction/estimation module, a prosody re-estimation module and a speech synthesis module, wherein said prosody prediction/estimation module predicts or estimates prosody information according to input text or speech, and transmit said predicted or estimated prosody information to said prosody re-estimation module;

said prosody re-estimation module generates new prosody information according to said predicted or estimated prosody information with said input controllable parameter set, and then provides said new prosody information to said speech synthesis module to generate synthesized speech, wherein said processor constructs a prosody re-estimation model used in said prosody re-estimation module according to the statistical prosody difference between said two corpora, wherein said prosody re-estimation model is expressed in the following form:

$$X_{rst}=\Delta\mu+[\mu_{src}+(X_{src}-\mu_{src})\rho\cdot\gamma]$$

wherein $X_{src}$ is the prosody information obtained from a source speech, $X_{rst}$ is the new prosody information, $\mu_{src}$ is the mean of prosody of a source corpus, and $\Delta\mu$, $\rho$, $\gamma$ are three controllable parameters.

9. The system as claimed in claim 8, wherein said processor is included in said computer system.

10. The system as claimed in claim 8, wherein if said $\Delta\mu$ is omitted from input, said system will assign a default value $(\mu_{tar}-\mu_{src})$ to $\Delta\mu$ where $\mu_{tar}$ is the mean of prosody of a target corpus and $\mu_{src}$ is the mean of prosody of said source corpus, if $\rho$ is omitted from input, said system will assign a default value, 1, to $\rho$, If $\gamma$ is omitted from input, said system will assign a default value, $\sigma_{tar}/\sigma_{src}$, to $\gamma$ where $\sigma_{tar}$ is the standard deviation of prosody of a target corpus and $\sigma_{src}$ is the standard deviation of prosody of said source corpus.

11. The system as claimed in claim 8, said system uses a dynamic distribution method to obtain said prosody re-estimation model.

12. A controllable prosody re-estimation method, executable on a controllable prosody re-estimation system or a computer system, said method comprising:

preparing a controllable prosody parameter interface for loading a set of controllable parameters;

predicting or estimating prosody information according to an input text or speech;

constructing a prosody re-estimation model, and using said prosody re-estimation model to generate new prosody information according to said input controllable parameter set and said predicted or estimated prosody information; and providing said new prosody information to a speech synthesis module to generate synthesized speech, wherein said prosody re-estimation model is expressed in the following form:

$$X_{rst}=\Delta\mu+[\mu_{src}+(X_{src}-\mu_{src})\rho\cdot\gamma]$$

wherein $X_{src}$ is the prosody information obtained from a source speech, $X_{rst}$ is the new prosody information, $\mu_{src}$ is the mean of prosody of a source corpus, and $\Delta\mu$, $\rho$, $\gamma$ are three controllable parameters.

13. The method as claimed in claim 12, wherein said a set of controllable parameters includes a plurality of controllable parameters, and when any of said controllable parameters is omitted from the input, said method further assigns a default value automatically to said omitted controllable parameter, and said default value is obtained statistically from prosody distribution of two parallel corpora.

14. The method as claimed in claim 12, wherein said prosody re-estimation model is constructed by using statistical prosody difference between two parallel corpora, said two parallel corpora include a recorded speech corpus and a synthesized speech corpus.

15. The method as claimed in claim 14, wherein said recorded speech corpus is recorded according to a given text corpus, and said synthesized speech corpus is synthesized by a text-to-speech system trained by said recorded speech corpus.

16. The method as claimed in claim 12, said method uses a static distribution method to obtain said prosody re-estimation model.

17. The method as claimed in claim 14, said method uses a dynamic distribution method to obtain said prosody re-estimation model.

18. The method as claimed in claim 17, wherein said a dynamic distribution method further includes:

computing the prosody distribution for each parallel utterance pair of recorded speech and synthetic speech from two speech corpora;

gathering statistics of prosody differences to construct a regression model by using a regression method; and estimating a target prosody distribution by using said regression model during speech synthesis.

19. The method as claimed in claim 12, wherein if said $\Delta\mu$ is omitted from input, said system will assign a default value $(\mu_{tar}-\mu_{src})$ to $\Delta\mu$ where $\mu_{tar}$ is the mean of prosody of a target corpus and $\mu_{src}$ is the mean of prosody of said source corpus, if $\rho$ is omitted from input, said system will assign a default value, 1, to $\rho$, if $\gamma$ is omitted from input, said system will assign a default value, $\sigma_{tar}/\sigma_{src}$, to $\gamma$ where $\sigma_{tar}$ is the standard deviation of prosody of a target corpus and $\sigma_{src}$ is the standard deviation of prosody of said source corpus.

20. A computer program product for controllable prosody re-estimation, said computer program product comprises a non-transitory memory and an executable computer program stored in said memory, said computer program executing as the following via a processor:

preparing a controllable prosody parameter interface for loading a set of controllable parameters;

predicting or estimating prosody information according to an input text or speech;

constructing a prosody re-estimation model, and using said prosody re-estimation model to generate new prosody information according to said input controllable parameter set and said predicted or estimated prosody information; and providing said new prosody information to a speech synthesis module to generate synthesized speech, wherein said prosody re-estimation model is expressed in the following form:

$$X_{rst}=\Delta\mu+[\mu_{src}+(X_{src}-\mu_{src})\rho\cdot\gamma]$$

wherein $X_{src}$ is the prosody information obtained from a source speech, $X_{rst}$ is the new prosody information, $\mu_{src}$ is the mean of prosody of a source corpus, and $\Delta\mu$, $\rho$, $\gamma$ are three controllable parameters.

21. The computer program product as claimed in claim 20, wherein said prosody re-estimation model is constructed by using statistical prosody difference between two parallel corpora, and said two parallel corpora include a recorded speech corpus and a synthesized speech corpus.

22. The computer program product as claimed in claim 20, wherein said prosody re-estimation model uses a dynamic distribution method to obtain said prosody re-estimation model.

23. The computer program product as claimed in claim 22, wherein said a dynamic distribution method further includes:

computing the prosody distribution for each parallel utterance pair of recorded speech and synthetic speech from two speech corpora;

gathering statistics of prosody differences to construct a regression model by using a regression method; and estimating a target prosody distribution by using said regression model during speech synthesis.

24. The computer program product as claimed in claim 20, wherein if said $\Delta\mu$ is omitted from input, said system will assign a default value ($\mu_{tar}-\mu_{src}$) to $\Delta\mu$ where $\mu_{tar}$ is the mean of prosody of a target corpus and $\mu_{src}$ is the mean of prosody of said source corpus, if $\rho$ is omitted from input, said system will assign a default value, 1, to $\rho$, if $\gamma$ is omitted from input, said system will assign a default value, $\sigma_{tar}/\sigma_{src}$, to $\gamma$ where $\sigma_{tar}$ is the standard deviation of prosody of a target corpus and $\sigma_{src}$ is the standard deviation of prosody of said source corpus.

25. The computer program product as claimed in claim 21, wherein said prosody re-estimation model is constructed via a static distribution method.

* * * * *